United States Patent
Oshima et al.

(10) Patent No.: US 9,167,166 B2
(45) Date of Patent: Oct. 20, 2015

(54) IMAGE DISPLAY DEVICE, IMAGING APPARATUS MOUNTED WITH IMAGE DISPLAY DEVICE AS FINDER DEVICE, AND IMAGE DISPLAY METHOD

(71) Applicant: FUJIFILM Corporation, Tokyo (JP)

(72) Inventors: Hiroyuki Oshima, Saitama (JP); Shigeru Kondou, Saitama (JP); Takashi Aoki, Saitama (JP); Kazuki Inoue, Saitama (JP); Daisuke Hayashi, Saitama (JP); Takeshi Misawa, Saitama (JP); Atsushi Misawa, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/486,653

(22) Filed: Sep. 15, 2014

(65) Prior Publication Data

US 2015/0036025 A1 Feb. 5, 2015

Related U.S. Application Data

(63) Continuation of application No. PCT/JP2012/080613, filed on Nov. 27, 2012.

(30) Foreign Application Priority Data

Mar. 16, 2012 (JP) ................. 2012-060381

(51) Int. Cl.
*H04N 5/232* (2006.01)
*G03B 13/06* (2006.01)
(Continued)

(52) U.S. Cl.
CPC ............ *H04N 5/23293* (2013.01); *G03B 13/06* (2013.01); *G03B 17/20* (2013.01); *H04N 5/23229* (2013.01); *H04N 5/272* (2013.01)

(58) Field of Classification Search
CPC .................................... H04N 5/23293
USPC ................... 348/341, 333.01, 333.08, 333.09
See application file for complete search history.

(56) References Cited

U.S. PATENT DOCUMENTS

| | | |
|---|---|---|
| 5,161,025 A | 11/1992 | Nakao |
| 2008/0198256 A1* | 8/2008 | Koppetz ........................ 348/341 |
| 2012/0002067 A1 | 1/2012 | Fukata |

FOREIGN PATENT DOCUMENTS

| | | |
|---|---|---|
| JP | 3-292067 A | 12/1991 |
| JP | 2006-59136 A | 3/2006 |

(Continued)

OTHER PUBLICATIONS

International Search Report issued in PCT/JP2012/080613, mailed on Dec. 25, 2012.

(Continued)

*Primary Examiner* — James Hannett
(74) *Attorney, Agent, or Firm* — Birch, Stewart, Kolasch & Birch, LLP

(57) ABSTRACT

An image display device includes a beam splitter that splits an incident light entering from a subject side, an imaging device that converts a first optical image generated by an one-side incident light split by the beam splitter into an electrical signal and outputs the converted electrical signal as a capture image, a synthesis image generating unit that generates an electronic information image, a display panel that displays the electronic information image, and an optical prism that emits an optical image of the electronic information image projected from the display panel to be superimposed on a second optical image generated by the other-side split incident light.

6 Claims, 21 Drawing Sheets

(51) Int. Cl.
*G03B 17/20* (2006.01)
*H04N 5/272* (2006.01)

(56) References Cited

FOREIGN PATENT DOCUMENTS

| JP | 2008-78908 A | 4/2008 |
|----|--------------|--------|
| JP | 2009-200552 A | 9/2009 |
| JP | 2009-239651 A | 10/2009 |
| JP | 2009-267792 A | 11/2009 |
| JP | 2010-107529 A | 5/2010 |
| JP | 2010-135894 A | 6/2010 |
| JP | 2011-35638 A | 2/2011 |
| JP | 2011-253512 A | 12/2011 |
| JP | 2012-4763 A | 1/2012 |
| JP | 2012-15889 A | 1/2012 |

OTHER PUBLICATIONS

PCT/ISA/237—Issued in PCT/JP2012/080613, mailed on Dec. 25, 2012.
Written Opinion of the International Preliminary Examining Authority issued in PCT/JP2012/080613, mailed on May 14, 2013.

* cited by examiner

54

IMAGE DISPLAY DEVICE, IMAGING APPARATUS MOUNTED WITH IMAGE DISPLAY DEVICE AS FINDER DEVICE, AND IMAGE DISPLAY METHOD

CROSS REFERENCE TO RELATED APPLICATION

This is a continuation of International Application No. PCT/JP2012/080613 filed on Nov. 27, 2012, and claims priority from Japanese Patent Application No. 2012-060381, filed on Mar. 16, 2012, the entire disclosures of which are incorporated herein by reference.

BACKGROUND

1. Technical Field

The present invention relates to an image display device, an imaging apparatus mounted with the image display device as a finder device, and an image display method.

2. Related Art

For example, for a beginner who walks in mountains and sees Yatsugatake Peaks through binoculars, it is difficult to know which mountain is Akadake and what mountain is seen by the side thereof. Here, when each of optical images of mountains seen within the binoculars is synthesized with a mountain name to be displayed, usability of the binoculars is improved.

Or, in constructing a building in a vacant lot of a city, when a construction designer can observe a state where a CG image of a designed building stands up in the vacant lot together with an optical image of a surrounding building group by observing a group of buildings around the vacant lot through a finder device of a digital camera owned by himself, a landscape after the construction may be checked in advance. This provides convenience.

If a technology that when a person, who wants to go to a destination but gets lost, sees a corresponding direction through a finder of a digital camera, the location of the destination hidden by a building group or names of surrounding buildings are displayed within the finder, is achieved, the usefulness of the digital camera is improved.

There has already been a technology that when a lens of a digital camera is directed to a specific direction, and a capture image (a live view image) is displayed on an LCD display device at the rear surface of the camera, for example, information or a place name of a landmark, or a building name is displayed to be superimposed on a capture image (e.g., Patent Literature 1 (JP-A-2006-59136)).

When a main object is to know the landmark information or the building name, a live view image of a subject may be displayed on the LCD display device provided on, for example, the rear surface of the camera, and, for example, the building name may be displayed to be superimposed on the live view image. However, when a main object is to observe a subject, what is highly demanded is to directly see a clear optical image of the subject through binoculars or an observation window of an optical finder device.

Patent Literature 2 (JP-A-2011-253512) as described below discloses a device which displays electronic information, such as illustrated information, to be synthesized together with the field of view seen through an observation window when a subject is observed through, for example, binoculars or a magnifying glass.

When an optical image of the subject is directly observed with an eye, and, for example, a name of a landmark, as the electronic information, is displayed to be synthesized with the field of view, it is possible to observe a clear optical image and also to know required electronic information together with the image. However, Patent Literature 2 does not disclose how to specifically configure the device of realizing the technology.

A technology of displaying electronic information to be superimposed on an optical image may be realized by applying a conventional technology disclosed in, for example, Patent Literature 3 (JP-A-2010-107529) as described below. A digital camera disclosed in Patent Literature 3 is configured such that when a displayed image of a projection-type display device provided within an optical finder is projected to be superimposed on an optical image of a subject visible to an eye of a user through the optical finder. Accordingly, when required electronic information is displayed on the projection-type display device, the user becomes capable of seeing an image in which the electronic information is superimposed on the optical image, with his/her eye.

It is easy to display an optical image of a subject and relevant information thereof, such as names, at roughly matching positions around the optical image. However, for example, when a mountain range including a series of many mountains are seen through binoculars, wrong information may be provided to a user when each mounting name is displayed to be superimposed on a slightly shifted position. Accordingly, it is required to display electronic information at matching positions on an optical image of a subject with a high precision.

For example, Patent Literature 4 (JP-A-2009-200552) and Patent Literature 5 (JP-A-H03-292067) disclose a finder device in which an optical finder and an electronic viewfinder are combined with each other. A capture image of a subject displayed on the electronic viewfinder of the finder device is not an optical image of the subject which comes into the optical finder. The capture image is an optical image which is photographed by an imaging device through light-condensing at a photographing lens provided at a location slightly apart from the finder device.

That is, a parallax occurs between the optical image which has passed through the optical finder, and the capture image displayed on the electronic viewfinder. In a case of a single focal lens camera, the parallax may be easily corrected, because there is always a fixed relationship. However, when the photographing lens is a zoom lens, the parallax may be varied according to a magnification change. Thus, it becomes difficult to perform alignment of the optical image with the capture image with a high precision.

SUMMARY OF INVENTION

Illustrative aspect(s) of the present invention is to provide an image display device, an imaging apparatus mounted with the image display device as a finder device, and an image display method in which electronic information may be displayed to be highly precisely aligned with and superimposed on an optical image of a subject.

An aspect of the present invention provides an image display device including: a beam splitter that splits an incident light entering from a subject side; an imaging device that converts a first optical image generated by an one-side incident light split by the beam splitter into an electrical signal and outputs the converted electrical signal as a capture image; a synthesis image generating unit that generates an electronic information image aligned with a main subject image in the capture image; a display panel that displays the electronic information image; and an optical prism that emits an optical image of the electronic information image projected from the display panel to be superimposed on a second optical image generated by the other-side split incident light.

Another aspect of the present invention provides an imaging apparatus being mounted with the image display device, as a finder device.

Another aspect of the present invention provides an image display method including: splitting an incident light entering from a subject side by a beam splitter; converting a first optical image generated by an one-side incident light split by the beam splitter into an electrical signal and outputting the converted electrical signal as a capture image by an imaging device; generating an electronic information image aligned with a main subject image in the capture image by a synthesis image generating unit; displaying the electronic information image on a display panel; and emitting an optical image of the electronic information image projected from the display panel to be superimposed on a second optical image generated by the other-side split incident light by an optical prism.

According to any of the aspects of the present disclosure, an imaging device is provided within an image display device, and the same image as a subject optical image seen by a user eye is photographed by the imaging device. Thus, based on the capture image, an electronic information image which is highly precisely aligned may be displayed to be superimposed on the subject optical image.

DESCRIPTION OF EMBODIMENTS

Hereinafter, an exemplary embodiment of the present invention will be described with reference to drawings. In the exemplary embodiment, as an example, a finder device (an image display device) mounted in a digital camera is described, but the image display device of the present invention is not limited thereto. Any image display device having an imaging device embedded therewithin, such as binoculars, a monocule, a fieldscope, a head mount display, may be employed as long as the image display device allows a subject to be observed through both an optical image and a capture image.

Figure 1:
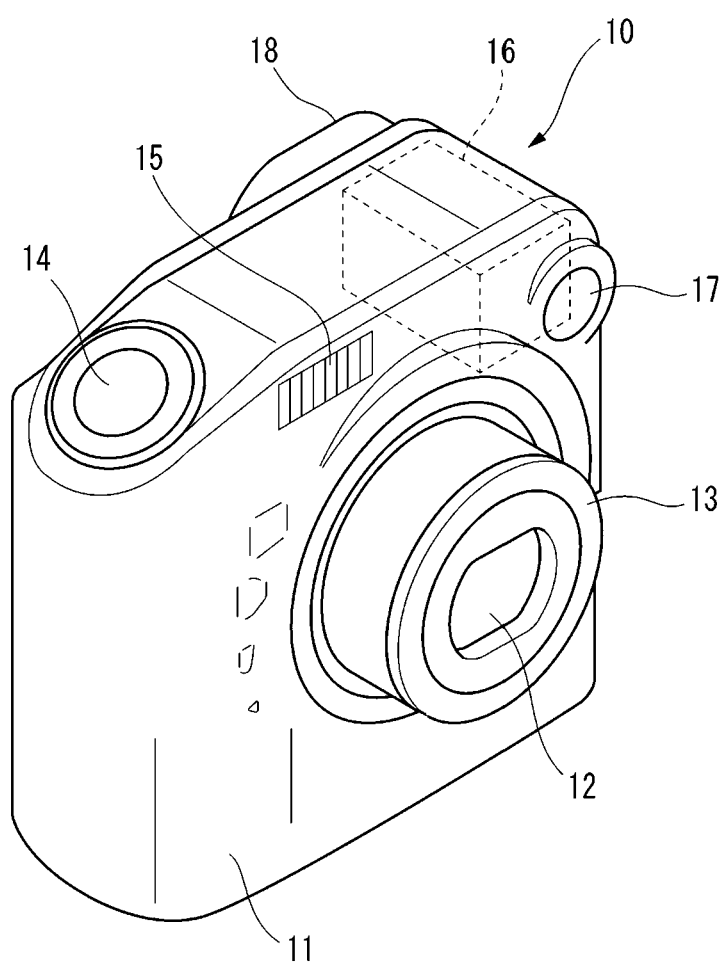
FIG. 1 is an external perspective view of a digital camera mounted with a finder device as an image display device according to a first exemplary embodiment of the present invention.

FIG. 1 is an external perspective view of a digital camera 10 according to a first exemplary embodiment of the present invention. The digital camera 10 includes a lens barrel 13 retractably attached at the front side of a camera case 11. A photographing lens 12 is stored in the lens barrel 13. A shutter release button 14 is provided at an upper left shoulder portion of the camera case 11 when viewed at a front side, and a liquid crystal display unit (not illustrated) is provided at the back side of the camera case 11.

A flash light emitting unit 15 is provided at the upper front surface of the camera case 11, and a finder device 16 is provided within a right shoulder portion of the camera case 11 when viewed at a front side. The finder device 16 is provided between an opening window 17 at a subject side and an observation window 18 at a photographer side (a user side).

Figure 2:
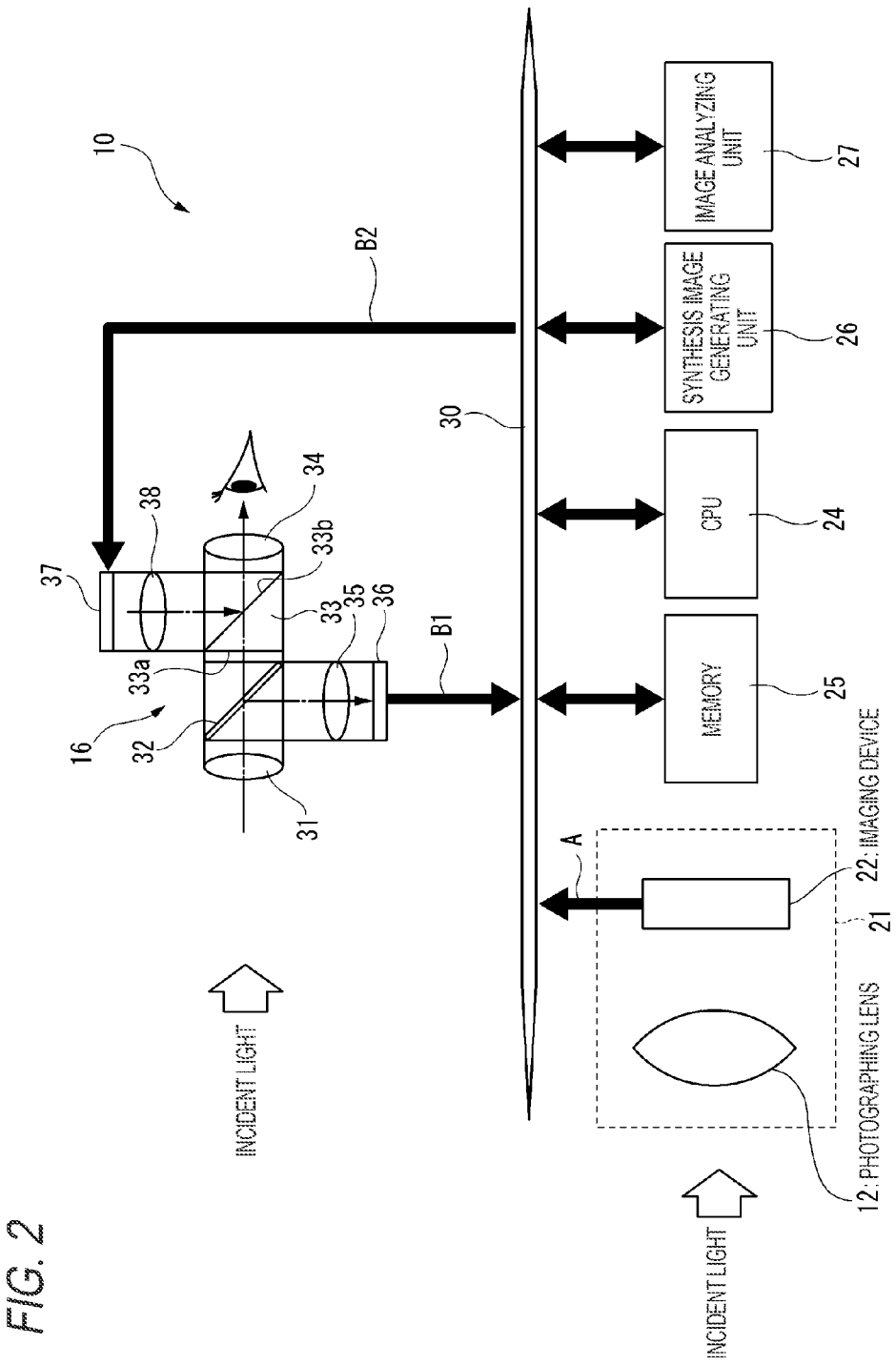
FIG. 2 is a functional block diagram of the digital camera of FIG. 1.

FIG. 2 is a functional block diagram of the digital camera 10 illustrated in FIG. 1. A photographing system 21 configured to photograph a still image or a moving image of a subject includes the photographing lens 12 illustrated in FIG. 1, and an imaging device 22, such as a CMOS image sensor, provided at the rear portion of the photographing lens 12.

The digital camera 10 includes a CPU 24 configured to perform a general control of the camera, a memory 25, a synthesis image generating unit 26, and an image analyzing unit 27, which are connected to a bus 30. A capture image signal A generated by the imaging device 22 is output to the bus 30.

Like in a conventional digital camera, the bus 30 of the digital camera 10 is provided with an image signal processing unit configured to perform, for example, an offset processing, a gamma correction processing, or an RGB/YC conversion processing on a capture image signal, an image compression unit configured to convert the processed capture image signal into image data of JPEG format, a card interface configured to record the JPEG image data in, for example, a memory card, and a display control unit configured to display the capture image or a live view image on a liquid crystal display unit at the rear portion of the camera. These units are not illustrated.

The finder device 16 of the present exemplary embodiment includes an objective lens 31 provided at the rear portion of the opening window 17 at the subject side as illustrated in FIG. 1, a beam splitter 32, such as a half mirror, provided at the rear portion of the objective lens 31, an optical prism 33 provided at a rear portion of the beam splitter 32, and an eyepiece 34 provided at a rear portion of the optical prism 33 and facing the observation window 18 at the user side as illustrated in FIG. 1. The objective lens 31 may be configured as a zoom lens to be operated in concert with a zoom magnification of the photographing lens 12.

The beam splitter 32 is disposed at an angle of 45° in relation to a common optical axis of the objective lens 31 and the eyepiece 34, and splits the incident light entering through the objective lens 31 into two lights. The split light at one side goes straight along the optical axis, and the light at the other side is reflected at 45°.

A condenser lens 35 of the finder device 16 is provided in front of the incident light reflected at 45°, and an imaging device 36 such as a CMOS image sensor is provided at a rear portion of the condenser lens 35. A capture image signal B1 generated by the imaging device 36 is output to the bus 30.

The optical prism 33 which the split light going straight from the beam splitter 32 enters includes an incident plane 33a and an emission plane 33b. The incident plane 33a is provided to be perpendicular to the optical axis, and the emission plane 33b is provided at an angle of 45° in relation to the optical axis. At a position which faces the emission plane 33b and is perpendicular to the optical axis, a display panel 37 of the finder device 16, and a lens 38 configured to condense image light displayed on the display panel 37 on the emission plane 33b are provided.

The display panel 37 is supplied with electronic information B2 through a display control unit (not illustrated) connected to the bus 30. The electronic information B2 is generated based on the capture image signal B1 generated by the imaging device 36.

Figure 3:
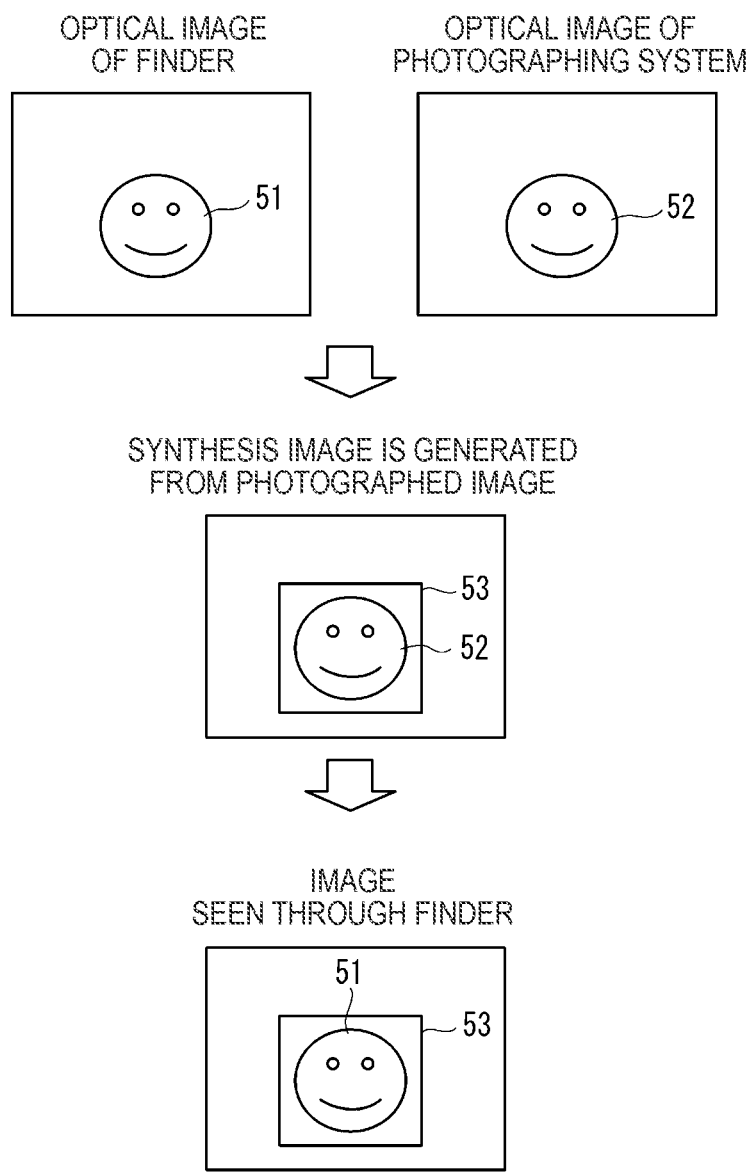
FIG. 3 is an explanatory view of an image synthesizing method of the finder device illustrated in FIG. 2.

FIG. 3 is an explanatory view of a function of the finder device 16. By adjusting the optical axis directional position of the condenser lens 35 of FIG. 2, a focal distance of the incident light from the subject and a focal distance of the imaging device 36 are adjusted to be the same. The incident light from the subject is split into two lights by the beam splitter 32, and the split light which goes straight enters an eye of a user through the optical prism 33 and the eyepiece 34. Accordingly, the user may see a subject optical image 51 of FIG. 3.

The split light reflected at an angle of 45° from the beam splitter 32 is imaged on a light receiving surface of the imaging device 36. The imaged subject optical image 52 is illustrated in FIG. 3. Positions of the subject optical images 51 and 52 are coincident with each other within a screen with a high precision. The capture image signal B1 generated by the imaging device 36 is a capture image signal of the subject optical image 52. Based on the capture image which has been image-processed, a frame 53 which surrounds, for example, a face of the subject is generated as electronic information from the synthesis image generating unit 26 of FIG. 2.

When an image of the frame 53 is displayed as the electronic information B2 on the display panel 37, the image of the frame 53 is highly precisely aligned with the subject optical image 51 going straight through the finder device 16, and is visible to the eye of the user. Here, when the subject optical image 52 as a face image photographed by the imaging device 36, together with the image of the frame 53, is displayed in, for example, green, the face of the subject optical image 51 is seen in green. When the face image of the subject optical image 52 is displayed in black, that is, the face image portion of the subject optical image 52 of the display panel 37 is not displayed, only the subject optical image 51 is surrounded by the frame 53 and is visible to the eye of the user.

Figure 4:
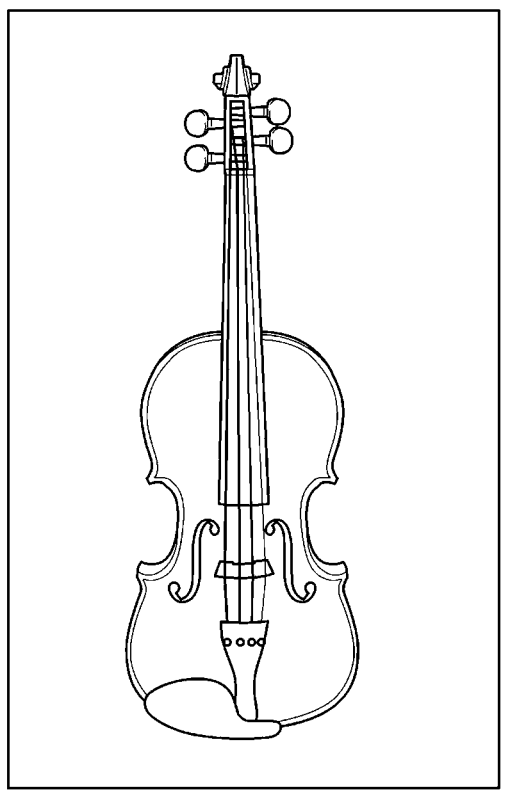
FIG. 4 is a view illustrating an example of an optical image seen through the finder device.
Figure 5:
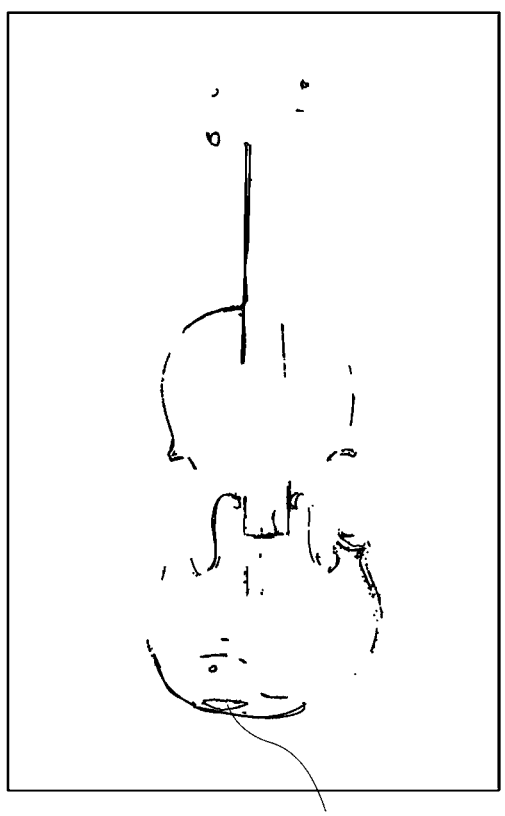
FIG. 5 is a view illustrating a whiteout portion when the optical image of FIG. 4 is photographed.

FIG. 4 is a view illustrating an example of a subject seen through the finder device 16. The optical image of a violin is provided. FIG. 5 is a view illustrating only a whiteout portion 54 obtained through analysis of the image analyzing unit 27 of FIG. 2 when the same optical image as the optical image of FIG. 4 is photographed by the imaging device 36. By the synthesis image generating unit 26, the whiteout portion 54 of FIG. 5 is generated as an image of electronic information flickering in, for example, red or white, and other regions are set as a masked image (displayed in black). When this is displayed as the electronic information B2 on the display panel 37, the whiteout region in the optical image of FIG. 4 is input to the eye of the user as an image flickering in red or white.

The whiteout portion 54 described in FIG. 5 is a whiteout portion in an image photographed by the imaging device 36 within the finder device 16. That is, the whiteout portion 54 is different from a whiteout portion in the capture image of the imaging device 22 which actually photographs the subject. However, since, for example, a difference of sensitivity or charge saturation amount between the imaging device 36 and the imaging device 22 is known in advance, it is possible to know whiteout in the imaging device 22 with a high precision by obtaining an image of the whiteout portion according to the difference.

Otherwise, the whiteout portion in the imaging device 22 which performs actual photography may be synthesized with the optical image which goes straight through the finder device 16 and is visible to the eye of the user. The whiteout portion in a live view image obtained by the imaging device 22 is obtained by the image analyzing unit 27, and an image indicating the whiteout portion is generated from the synthesis image generating unit 26.

When the synthesis image itself is displayed on the display panel 37, a deviation of a parallax amount occurs between the synthesis image and the optical image going straight through the finder device 16. Therefore, a matching processing is performed between the capture image obtained by the imaging device 22 and the capture image obtained by the imaging device 36, and the extent of the deviation is analyzed by the image analyzing unit 27 so that the position of the synthesis image to be displayed on the display panel 37 is shifted by the deviation amount. Accordingly, the electronic information which is highly precisely aligned with the optical image going straight through the finder device 16 may be displayed as a synthesis image.

In the above described exemplary embodiment, an image of a whiteout portion is synthesized with an optical image, but a blackened region or a color saturated region (at least one of RGB is maximized) may be synthesized with the optical image.

According to the above described exemplary embodiment, a geometric deviation between the image displayed on the display panel 37 and the optical image which goes straight through the finder device 16 and is visible to the eye of the user is eliminated. Thus, even when a GUI display of a pixel unit, such as warning of whiteout or blackening is performed, the display may be possible without a sense of incompatibility.

In the configuration of FIG. 2, when a liquid crystal shutter is provided at a front stage of the optical prism 33, the live view image of the imaging device 22 may be displayed on the display panel 37 by closing the liquid crystal shutter so that the finder device 16 may be used as an electronic viewfinder device.

Figure 6:
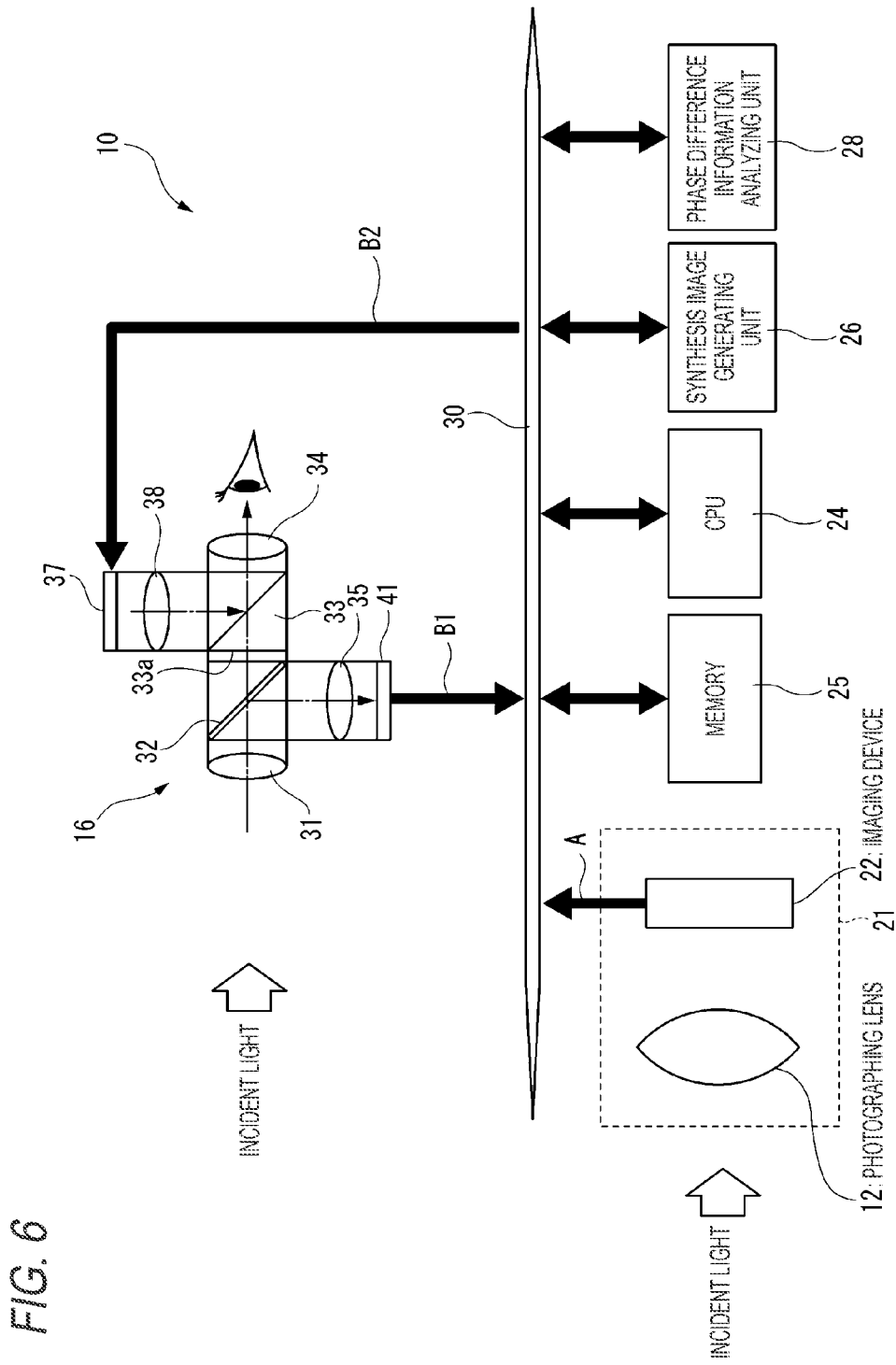
FIG. 6 is a functional block diagram of a digital camera according to a second exemplary embodiment of the present invention.

FIG. 6 is a functional block diagram of a digital camera according to a second exemplary embodiment of the present invention. The present exemplary embodiment is different from that of FIG. 2 in that as an imaging device 41 provided in the finder device 16, an imaging device provided with phase difference detection pixels on the whole surface of an imaging region is used. The bus 30 is connected to a phase difference information analyzing unit 28.

The phase difference detection pixels refer to, for example, pixels in which at one side shading curtain opening of two adjacent pixels and the other side shading curtain opening are provided eccentrically in the opposite directions. Accordingly, one side pixel receives the incident light when the subject is seen by a right eye (or a left eye), and the other side pixel receives the incident light when the subject is seen by a left eye (or a right eye) so that a distance to the subject may be detected. The phase difference detection pixels as described above are conventionally known in, for example, Japanese Laid-Open Patent Publication No. 2011-232371 or Japanese Laid-Open Patent Publication No. 2011-227388, and are generally used in a phase difference AF method in the field of a digital camera.

In the imaging device 41 of the present exemplary embodiment, pairs of phase difference detection pixels are provided discretely on the whole surface of the imaging device light receiving surface. Thus, a distance to each photographed subject within a screen may be individually calculated. A distance to a subject or image blurring is detected by the phase difference information analyzing unit 28 of FIG. 6.

Figure 7:
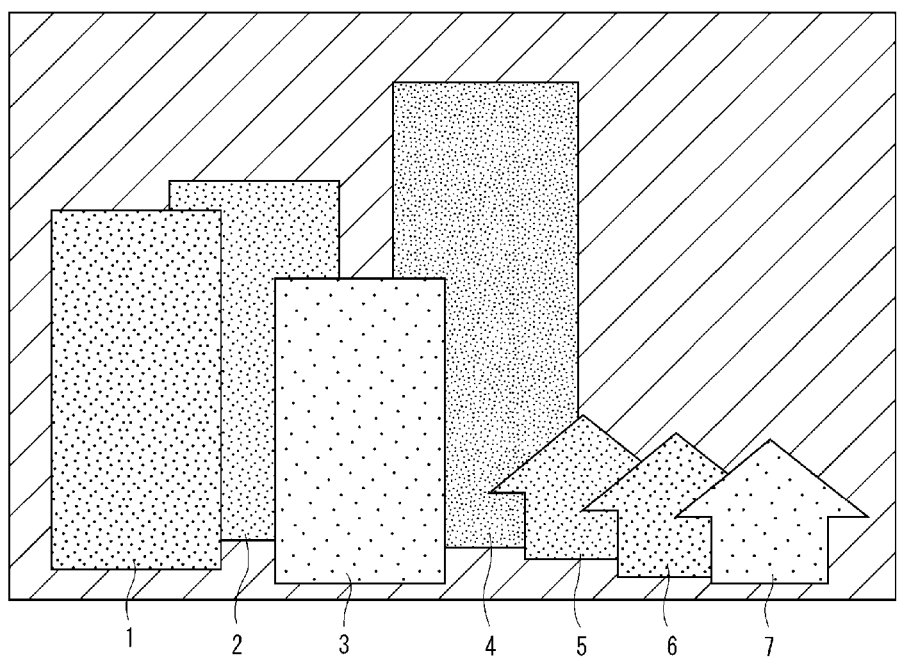
FIG. 7 is a view illustrating an example of a synthesis image generated by a synthesis image generating unit of FIG. 6.

FIG. 7 is a view illustrating an example of an image generated by the synthesis image generating unit 26 of FIG. 6. In the illustrated example, the imaging device 41 photographs an image of four buildings 1, 2, 3 and 4 and three houses 5, 6 and 7 as main subjects within one screen. The phase difference information analyzing unit 28 calculates distances to the four buildings 1 to 4 and the three houses 5 to 7, and the synthesis image generating unit 26 obtains an image in which the respective images of the buildings 1 to 4 and the houses 5 to 7 are cut out from a background image.

The synthesis image generating unit 26 generates colored images according to a distance from the finder device 16 based on the images of the buildings 1 to 4, and the houses 5 to 7 as electronic information. For example, the house 7 and the building 3 at the nearest distance are set as white images, the building 1 and the house 6 at the second nearest are set as pink images, . . . , the building 4 at the furthermost distance is set as a red image, and the background image is set as a black image, which are displayed on the display panel 37. The image of buildings and houses displayed on the display panel 37 is highly precisely matched with an optical image of buildings and houses visible to the eye of the user through the finder device 16. Accordingly, when seeing an optical image by looking in the finder device 16, the user may intuitively recognize the distances to main subjects by the display colors of the main subjects.

Through the phase difference information, it is possible to know a region in which image blurring occurs. Accordingly, electronic information indicating a region of image blurring occurring in an image captured by the imaging devices 36 and 41 (or the imaging device 22 provided with phase difference detection pixels) may be synthesized to be aligned with the optical image transmitted through the finder device 16.

Figure 8:
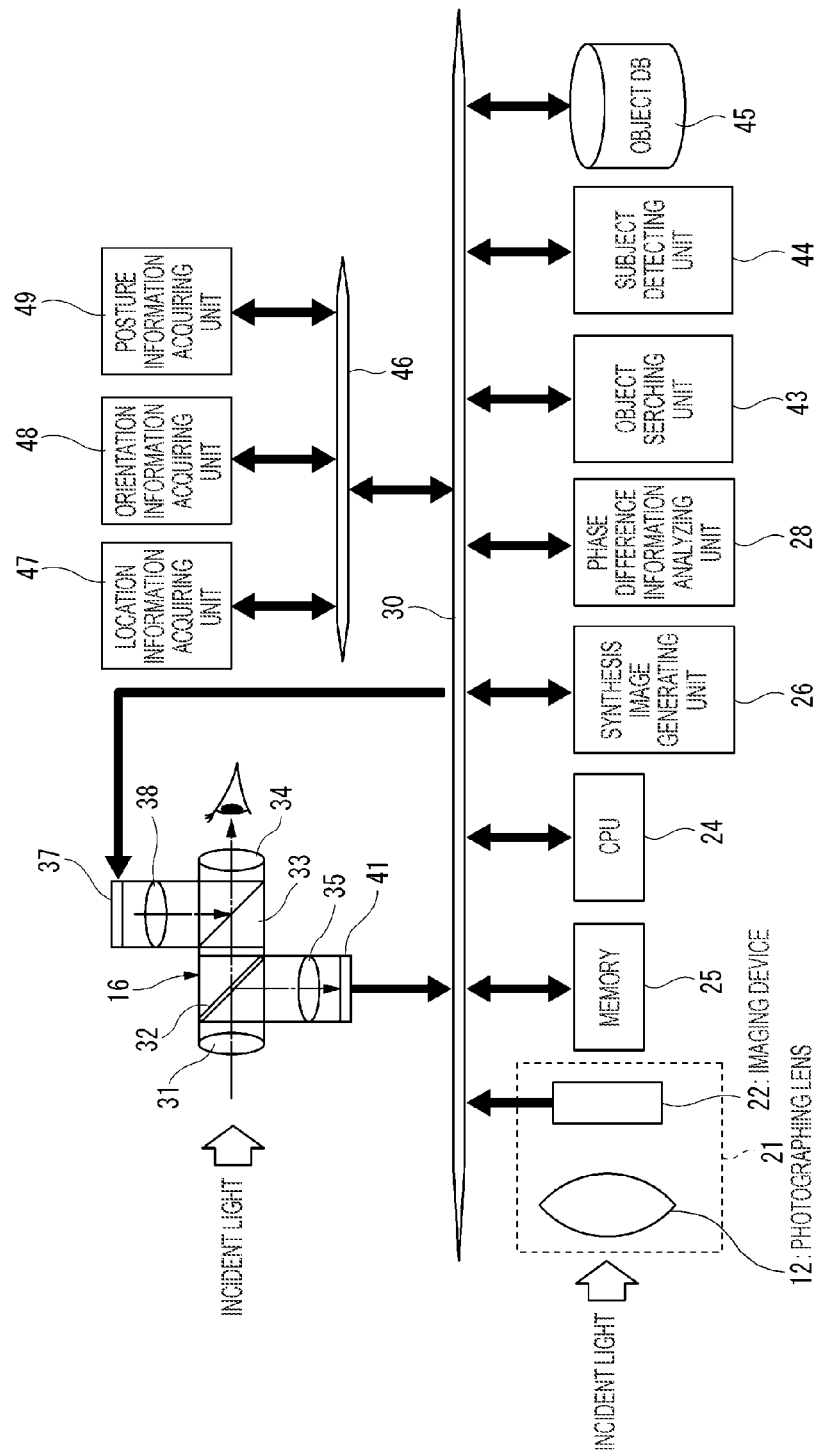
FIG. 8 is a functional block diagram of a digital camera according to a third exemplary embodiment of the present invention.

FIG. 8 is a functional block diagram of a digital camera according to a third exemplary embodiment of the present invention. The present exemplary embodiment is different from that of FIG. 6, in that the following function is added. The bus 30 is connected to an object searching unit 43, a subject detecting unit 44, an object database (DB) 45, and a second bus 46, and the second bus 46 is connected to a location information acquiring unit 47, an orientation information acquiring unit 48, and a posture information acquiring unit 49.

The object DB 45 may be provided within the camera. However, when a wide range of object data is used, a database connected to a network such as internet may be used.

The location information acquiring unit 47 is, for example, a GPS (Global Positioning System), the orientation information acquiring unit 48 is an electronic compass configured to detect an orientation, and the posture information acquiring unit 49 is configured to detect a posture of a camera through, for example, a G sensor (a detection sensor of a gravity direction), that is, a posture of the finder device 16. Various objects are stored in the object DB 45. Examples of the object may include objects on geographic information indicating public facilities or other facilities, buildings, topography, streams, lakes, sea, railroads, roads, place names, and addresses of private acquaintances of a user, or objects on information indicating current locations of various information devices (e.g., smart phones to be described in FIGS. 20 and 21) held by, for example, acquaintances.

Figure 9:
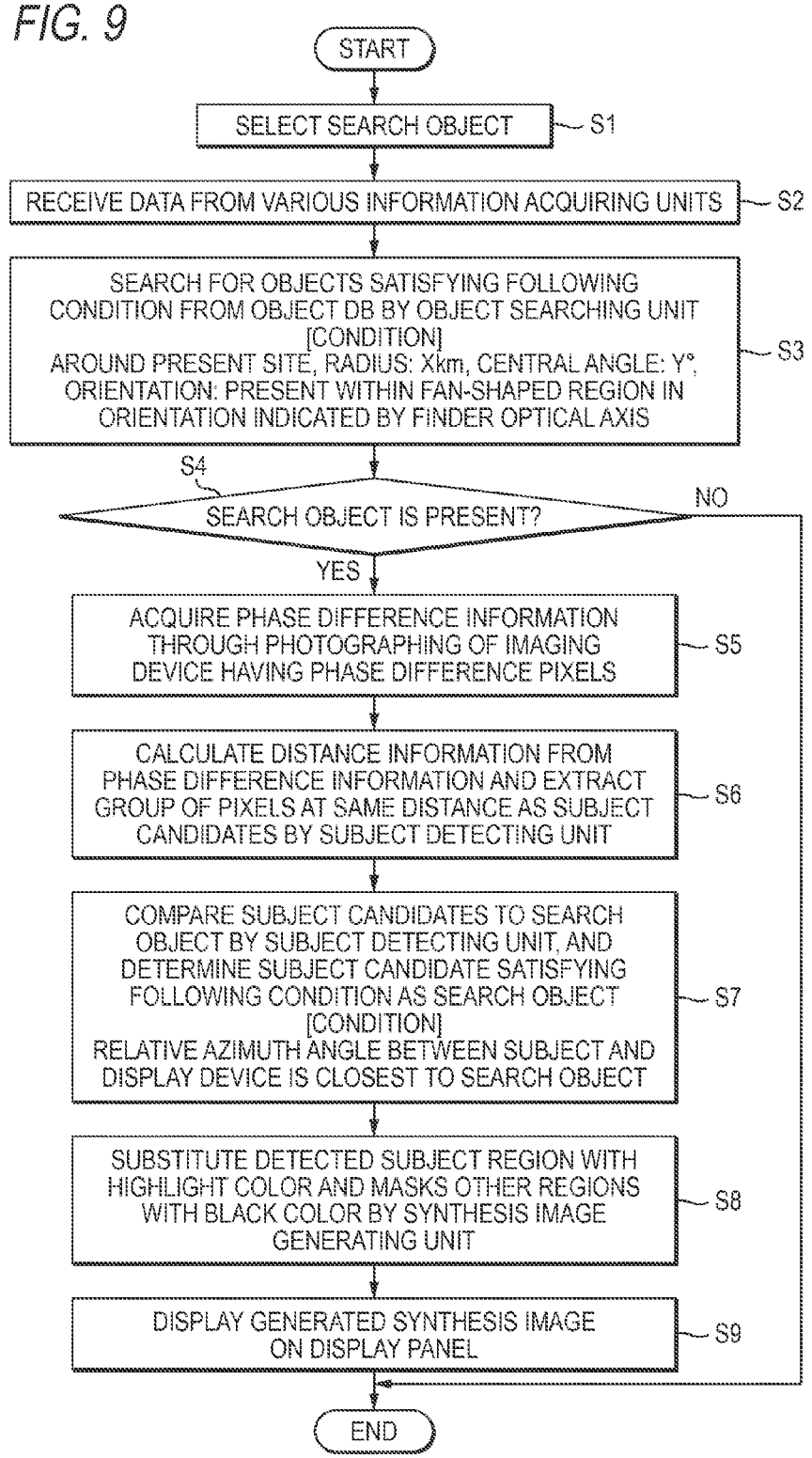
FIG. 9 is a flow chart illustrating a control sequence performed by a CPU of FIG. 8.

FIG. 9 is a flow chart illustrating a control sequence performed by the CPU 24 of FIG. 8. First, in step S1, a user selects a search object. For example, the user wants to find a Kasumigaseki building as a destination (e.g., building 4 of FIG. 7) and selects the Kasumigaseki building 4 as the search object through a menu screen of a liquid crystal display unit on a camera rear surface.

Then, the CPU 24 acquires location information, orientation information, and posture information from the various information acquiring units 47, 48 and 49, and in step S3, the object searching unit 43 of FIG. 8 searches for objects satisfying a searching condition from the object DB 45. For example, the searching is performed under a searching condition that "present within a radius X km around a present site, and within a fan-shaped region at a central angle Y° around the orientation indicated by the optical axis of the finder device 16."

Figure 10:
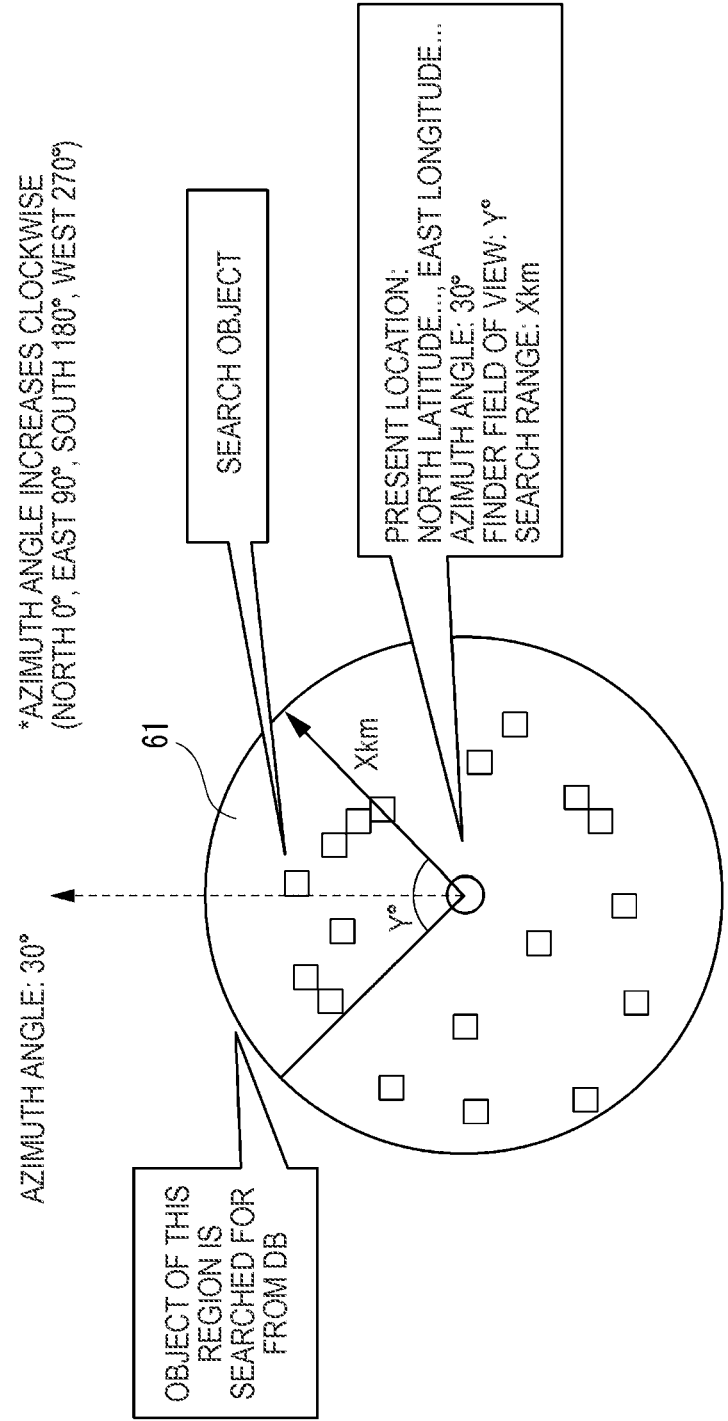
FIG. 10 is an explanatory view of finding of a search object within a field of view of a finder device of the digital camera according to the third exemplary embodiment of the present invention.

In step S4, it is determined if the search object is present among the objects which are searched for in step S3 as objects present within a range of the field of view when the user looks in the finder device 16. When the search object is not present, the processing is finished. FIG. 10 illustrates a fan-shaped range 61 of the field of view satisfying the searching condition.

When the search object is present within the fan-shaped range 61 of the field of view, the processing proceeds to the following step S5, and phase difference information photographed by phase difference detection pixels in the imaging device 41 within the finder device is obtained. Then, in step S6, the phase difference information analyzing unit 28 of FIG. 8 calculates distance information from the phase difference information, and the subject detecting unit 44 extracts capture images of a group of pixels which photographs subjects at the same distance, as subject candidates.

Figure 11:
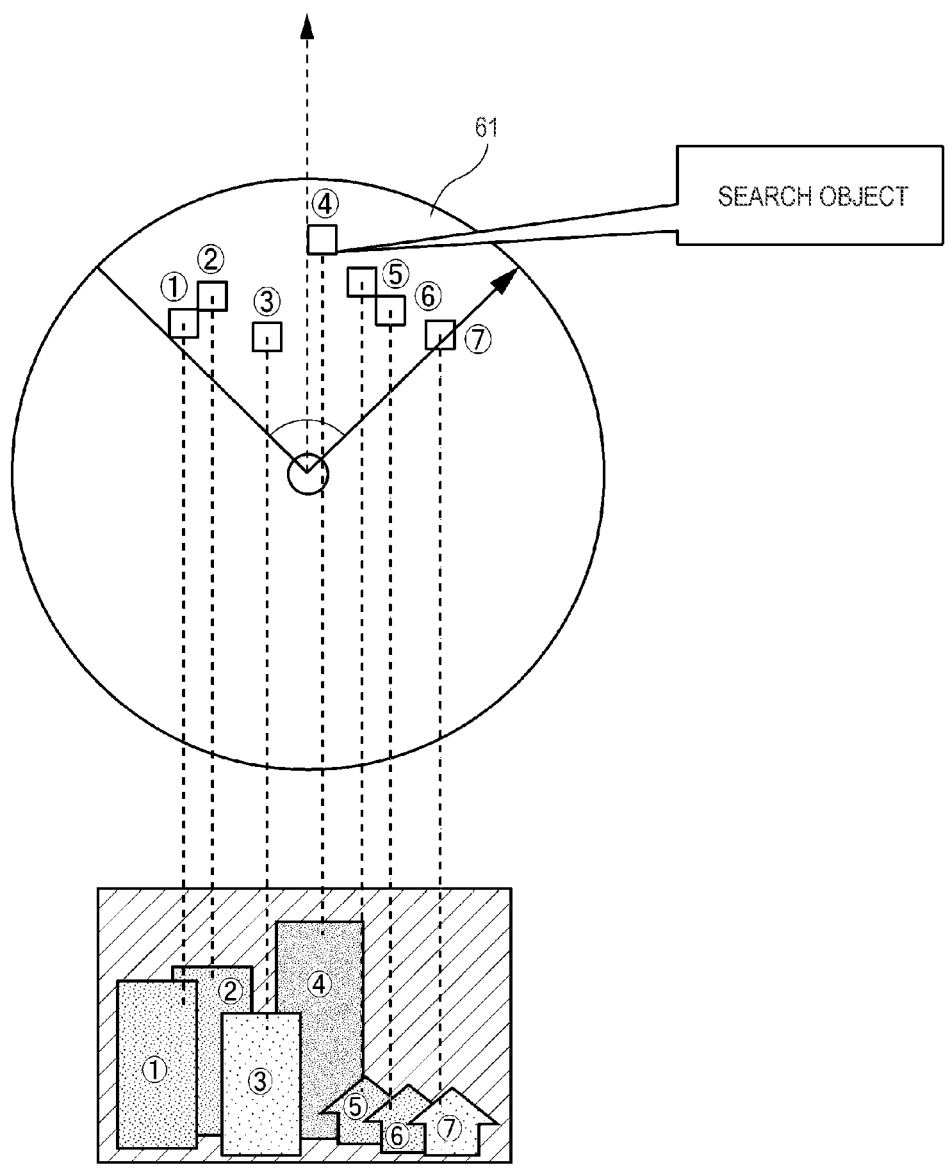
FIG. 11 is an explanatory view of finding of the search object within the field of view of the finder device according to the third exemplary embodiment of the present invention.

In step S7, the subject candidates are compared to the search object. FIG. 11 is a view illustrating the relationship among objects searched for from database within the fan-shaped range 61 of the field of view, the search object (building 4 in this example) selected by the user, and the image captured by the imaging device 41. In the comparison in step S7, a subject candidate which satisfies a condition that "a relative azimuth angle between a subject and the image display device (the finder device 16) is closest to the search object" is determined as the search object.

Figure 12:
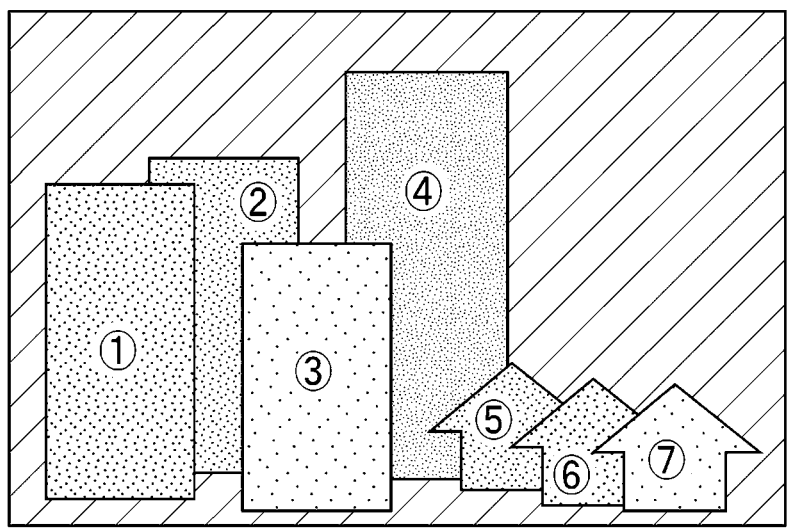
FIG. 12 is a view illustrating an example of an image captured by an imaging device within the finder device according to the third exemplary embodiment of the present invention.
Figure 13:
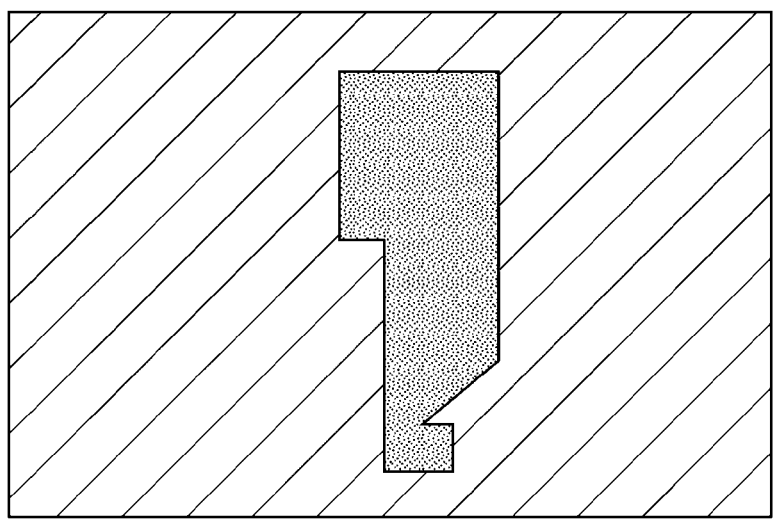
FIG. 13 is a view of an image region corresponding to the search object, which is cut out from the capture image illustrated in FIG. 12.

Next, in step S8, the synthesis image generating unit 26 substitutes a region of the detected subject with a highlight color image (electronic information), and masks other regions with a black color. That is, FIG. 12 illustrates an image of main subjects photographed by the imaging device 41, in which the buildings 1 to 4 and the houses 5 to 7 are imaged. From the image, only an image of the subject candidate determined as the search object (an image of building 4) is cut out. The cut-out image is illustrated in FIG. 13. In FIG. 13, only an image of a shown portion of the building 4 is cut out and generated as, for example, a red image. Other regions are displayed in black. The display in black indicates that no emission color is present when the regions are displayed on the display panel 37.

Figure 14:
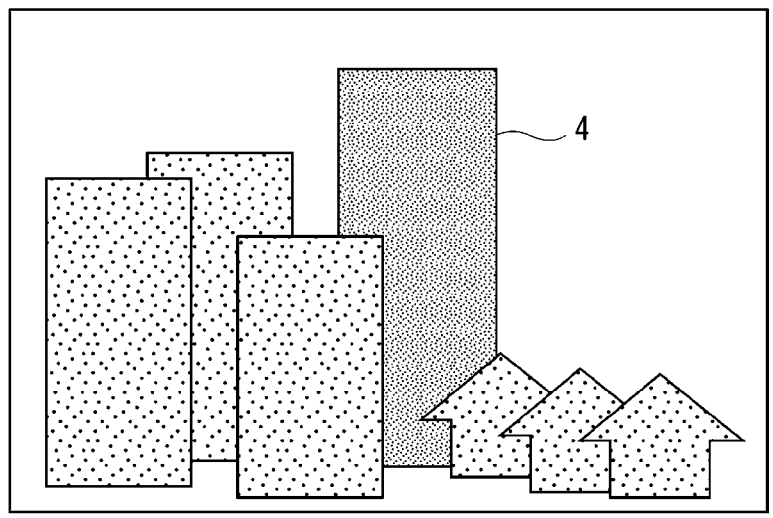
FIG. 14 is a view illustrating an image in which the image of FIG. 3 is synthesized with an optical image seen through the finder device of the digital camera according to the third exemplary embodiment of the present invention.

Next, in step S9, the image of FIG. 13 is displayed on the display panel 37 as electronic information to be synthesized to be aligned with the optical image of the subject. Accordingly, the image illustrated in FIG. 14 is visible to the eye of the user. The image of FIG. 14 is constituted by the optical image visible to the eye of the user through the finder device 16 which is synthesized with the image of FIG. 13. Since light from the display panel 37 is not present in the black region of FIG. 13, only the clear optical image transmitted through the finder device 16 is visible to the eye of the user. In contrast, in relation to the building 4, the red image of the building 4 described in FIG. 13 is visible to the eye of the user while being superimposed on the optical image of the building 4 which is transmitted through the finder device 16. Accordingly, when looking in the finder device 16, the user may see the optical image in which only the building 4 is highlighted in red.

In the third exemplary embodiment, the subject image corresponding to the search object is colored in a highlight color. However, the subject corresponding to the search object may not been seen by being hidden by shadows of other subjects. When the search object is detected to be hidden by a shadow of a subject present at the front side in a depth direction, electronic information indicating the presence of the search object may be displayed to be synthesized. For example, a red circular frame may be displayed with flickering to be superimposed on the front-side subject image so that the user may recognize the presence of the search object.

In the third exemplary embodiment, the subject image corresponding to the search object is only colored in the highlight color, but a name of the search object may be additionally displayed on the display panel 37.

Otherwise, only the name may be displayed to be superimposed on the capture image of the imaging device 41. Since the position of the optical image transmitted through the finder device 16, and the position of the capture image of the light split from the optical image are coincident with each other with a high precision, in a case of a mountain range including a series of many mountains as a subject, a name of each of mountains included in the mountain range may be displayed to be synthesized with the optical image without positional deviation.

Figure 15:
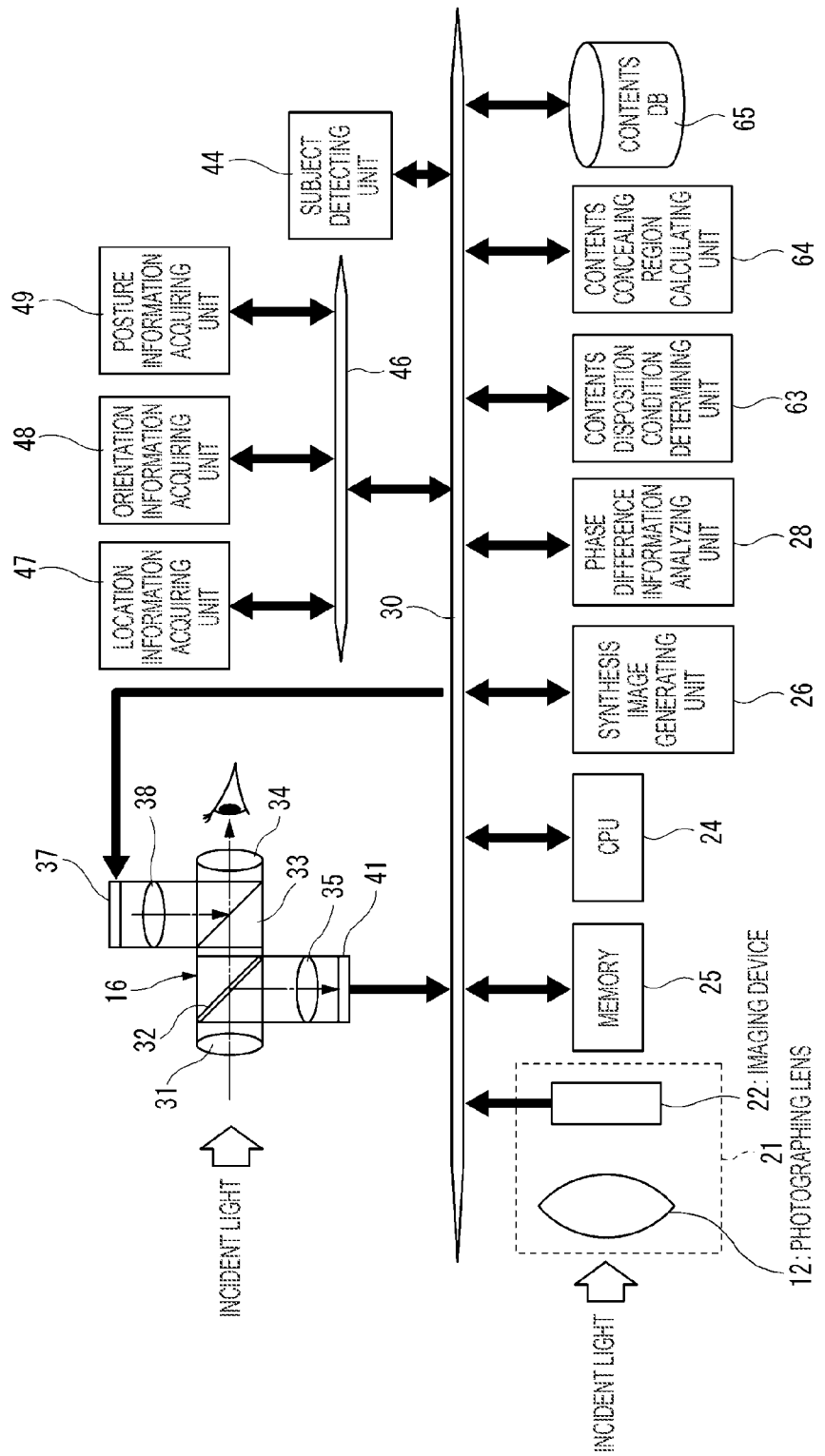
FIG. 15 is a functional block diagram of a digital camera according to a fourth exemplary embodiment of the present invention.

FIG. 15 is a functional block diagram of a digital camera according to a fourth exemplary embodiment of the present invention. Unlike the exemplary embodiment of FIG. 8, instead of the object searching unit 43 of FIG. 8, a contents disposition condition determining unit 63 and a contents concealing region calculating unit 64 are provided. Instead of the object DB 45, a contents database (DB) 65 is provided.

Figure 16:
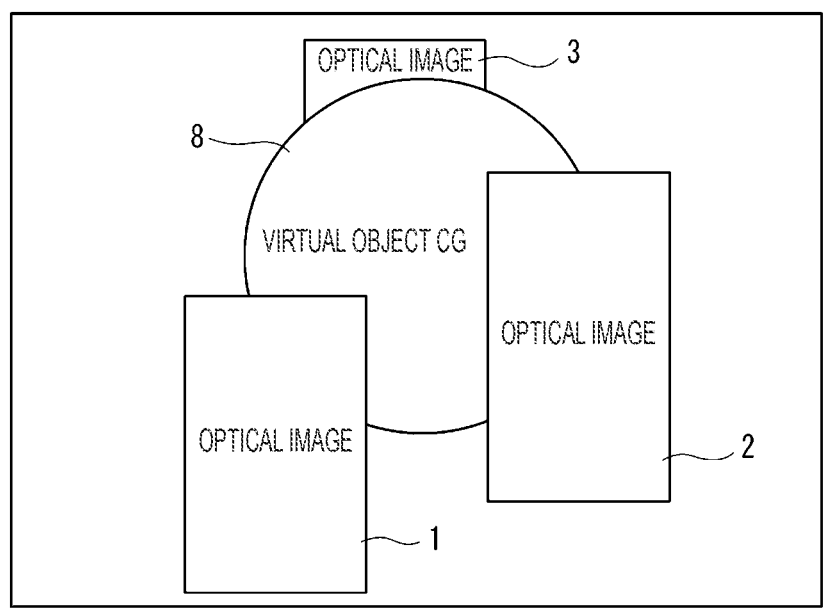
FIG. 16 is an explanatory view of a synthesis image realized according to the fourth exemplary embodiment of the present invention.

In the fourth exemplary embodiment, for example, as illustrated in FIG. 16, synthesis of an image seen by a user is performed in which an image of contents (a CG image of a virtual object) is synthesized with a vacant lot between optical images of the buildings 1, 2, and 3 seen by the user who looks in the finder device 16.

Figure 17:
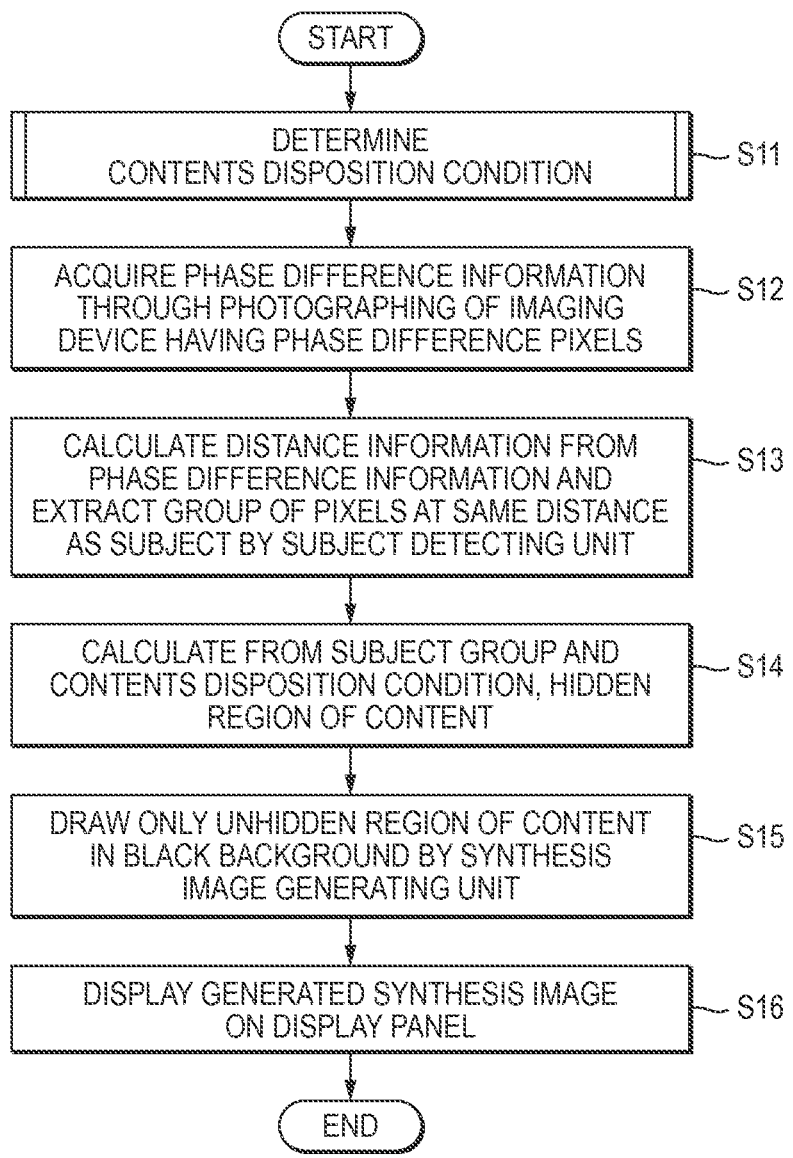
FIG. 17 is a flow chart illustrating a control sequence performed by a CPU of FIG. 15.

FIG. 17 is a flow chart illustrating a control sequence performed by the CPU 24 of FIG. 15. First, in step S11, a disposition condition of a content (a virtual object) 8 is determined. A flow chart illustrating a detailed sequence of a contents disposition condition determination in step S11 is illustrated in FIG. 18.

Figure 18:
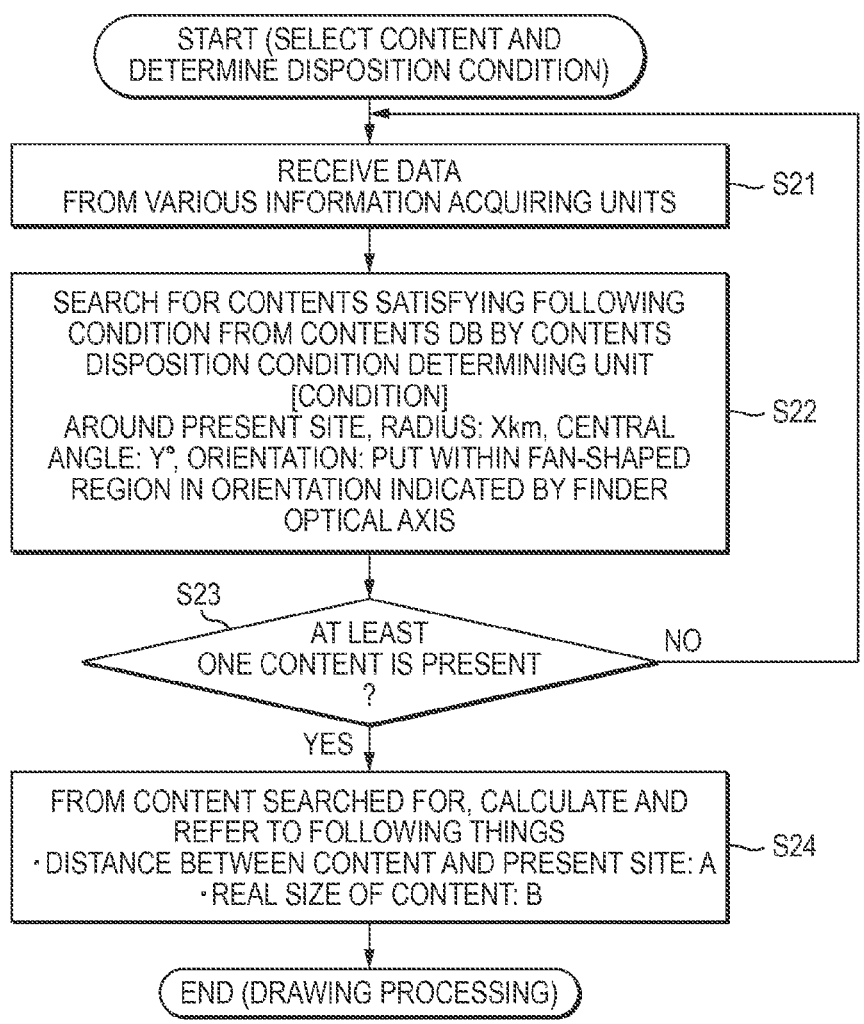
FIG. 18 is a flow chart illustrating a detailed sequence of a contents disposition condition determination in the flow chart of FIG. 17.

In FIG. 18, first, in step S21, data on location information and orientation information of a present site, and finder posture information are received from the various information acquiring units 47, 48 and 49 of FIG. 15.

Next, in step S22, by the contents disposition condition determining unit 63 of FIG. 15, contents which satisfy a condition are searched for from the contents DB 65. The condition may indicate that "allowed to be put in an empty space present within a radius X km around a present site, and within a fan-shaped region at a central angle Y° around the longitudinal direction indicated by the finder optical axis." The respective contents stored in the contents DB 65 are assigned, for example, sizes according to world coordinate, and are searched for according to the condition determined based on a GPS signal, an orientation signal, and a posture signal of the finder device 16.

Next, in step S23, it is determined if at least one content satisfying the condition is present when the contents DB 65 is searched. If no content is present, the process proceeds back to step S21. If at least one content is present, the process proceeds from step S23 to step S24. From the content searched for, a distance A between the content and the present site is calculated, and a rear size B of the content is read out from the contents DB 65 and referred to. Then, the process proceeds to step S12 in FIG. 17.

In step S12, the region seen through the finder device 16 is photographed by the imaging device 41 having phase difference detection pixels to acquire phase difference information. In step S13, based on the phase difference information, the subject detecting unit 44 of FIG. 15 extracts the buildings 1, 2, and 3 in the capture image in the same manner as in step S6 of FIG. 9.

In step S14, from the subject group (in the above described example, the buildings 1, 2, and 3) and the contents disposition condition, a hidden region of the content is calculated. The hidden region refers to a region of the rear-side content which is hidden by the front-side subjects in the depth direction of the capture image.

Figure 19:
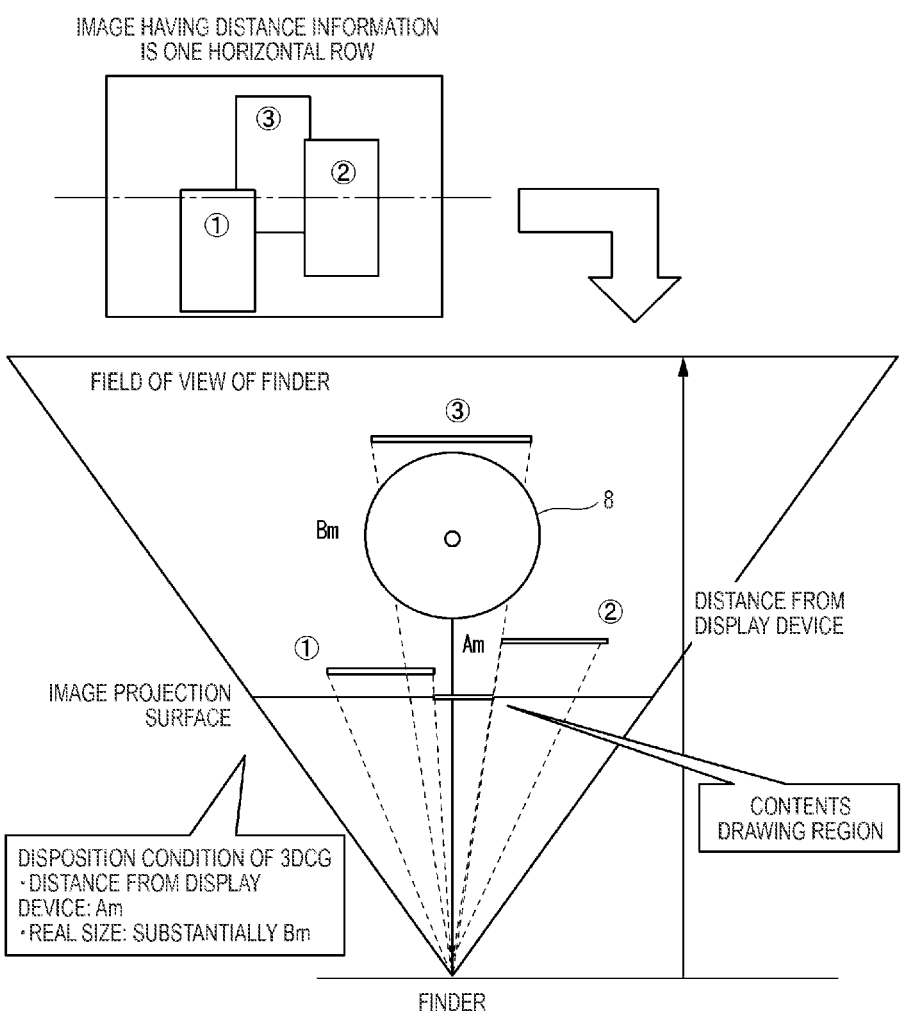
FIG. 19 is an explanatory view of a contents hidden region calculation in the flow chart of FIG. 17.

FIG. 19 is an explanatory view of a contents hidden region calculation. A capture image of the buildings 1, 2, and 3 of the subject group is disposed in a virtual three-dimensional space, and the content to be drawn is disposed in the three-dimensional space. Then, by using the finder device 16 as a reference viewpoint, a hiding relationship between the subject group and the content is calculated according to a conventionally known ray tracing method.

The ray tracing method refers to a method of calculating light reaching each of pixels of the imaging device 41 based on a principle "light from the subject at the forefront side reaches and enters eyes." As for the ray tracing method, a 3DCG drawing method of determining a color of a filter mounted in each pixel or a brightness is a general method.

When the hidden region and the drawing region of the content or the subject are found out in step S14 of FIG. 17, the process proceeds to step S15. The synthesis image generating unit 26 of FIG. 15 generates only a drawing region of a CG image of the content. Then, in the final step S16, only the drawing region of the content is displayed on the display panel 37, and other regions are displayed in black.

Accordingly, as illustrated in FIG. 16, the CG image of the content 8 is displayed as if present behind the optical image of the front-side buildings 1 and 2. A portion of the building 3 behind the content 8, which is hidden by the content 8, is covered with display of the content 8 so that an image of the content 8 is displayed in front of the building 3.

Since, for example, the positional relationship between the imaging device 41 and the imaging device 22 is known in advance, the CG image of the content 8 may be synthesized with the capture image obtained by the imaging device 22 without positional deviation when the subject is photographed by the imaging device 22.

According to the fourth exemplary embodiment, it is configured that a virtual object (a content) to be provided in an empty space within a range of the field of view of the finder device 16 is automatically selected from contents registered in advance in the contents DB 65. Therefore, there is an advantage in that a time a user spends selecting a content is reduced.

However, some users may want to display a CG image of their desired content to be synthesized within the finder device 16. Also, they may want to display the CG image of a user-selected content in place of the existing building, not in the empty space.

In this case, a user may be allowed to select a content and specify a size or a place in which the content is provided through a menu screen of a liquid crystal display unit on a camera rear surface so that the content may be synthesized with a capture image through magnification/reduction.

A finder device of an imaging apparatus has been described as an image display device according to exemplary embodiments of the present invention, but the configuration of the imaging apparatus is not limited thereto. Other imaging apparatuses according to the present invention may be, for example, an internal or external attachment-type PC camera, or a portable terminal device having a photography function, as described above.

A portable terminal device as an exemplary imaging apparatus may be, for example, a mobile phone, a smart phone, a PDA (Personal Digital Assistants), or a portable game machine. Hereinafter, as an example, the smart phone will be described in detail with reference to drawings.

Figure 20:
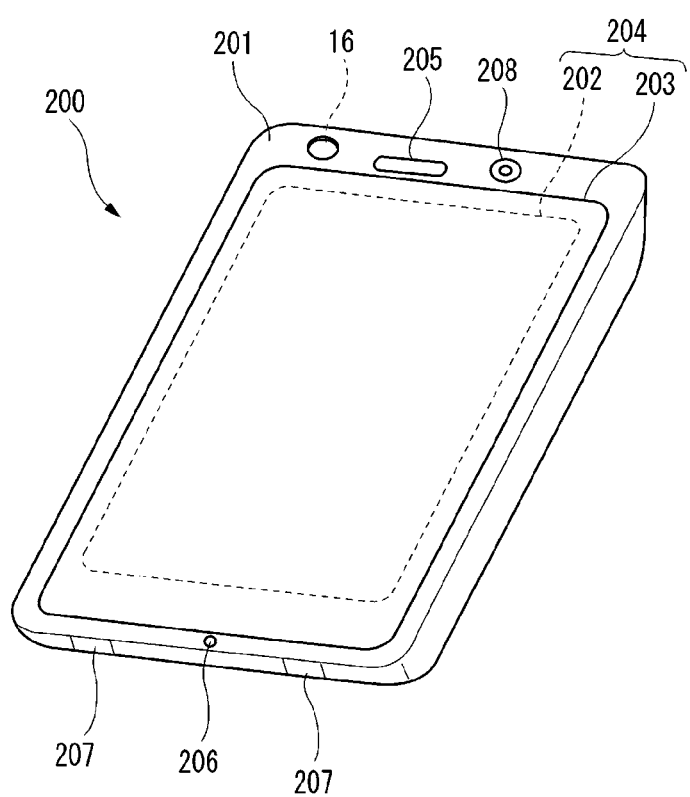
FIG. 20 is an external perspective view of a digital camera (a smart phone) according to a fifth exemplary embodiment of the present invention.

FIG. 20 illustrates an external appearance of a smart phone 200 as an exemplary imaging apparatus. The smart phone 200 illustrated in FIG. 20 includes a flat-platy case 201, and a display input unit 204 on one-side surface of the case 201. The display input unit 204 includes a display panel 202 as a display unit, and an operation panel 203 as an input unit, which are integrated with each other. The case 201 includes a speaker 205, a microphone 206, an operation unit 207, and a camera unit 208, and further includes the finder device 16 described in the exemplary embodiments of FIGS. 2 and 6. Meanwhile, the configuration of the case 201 is not limited to this. For example, it is possible to employ other configurations in which a display unit and an input unit are separate, or a folding structure or a sliding mechanism is included.

Figure 21:
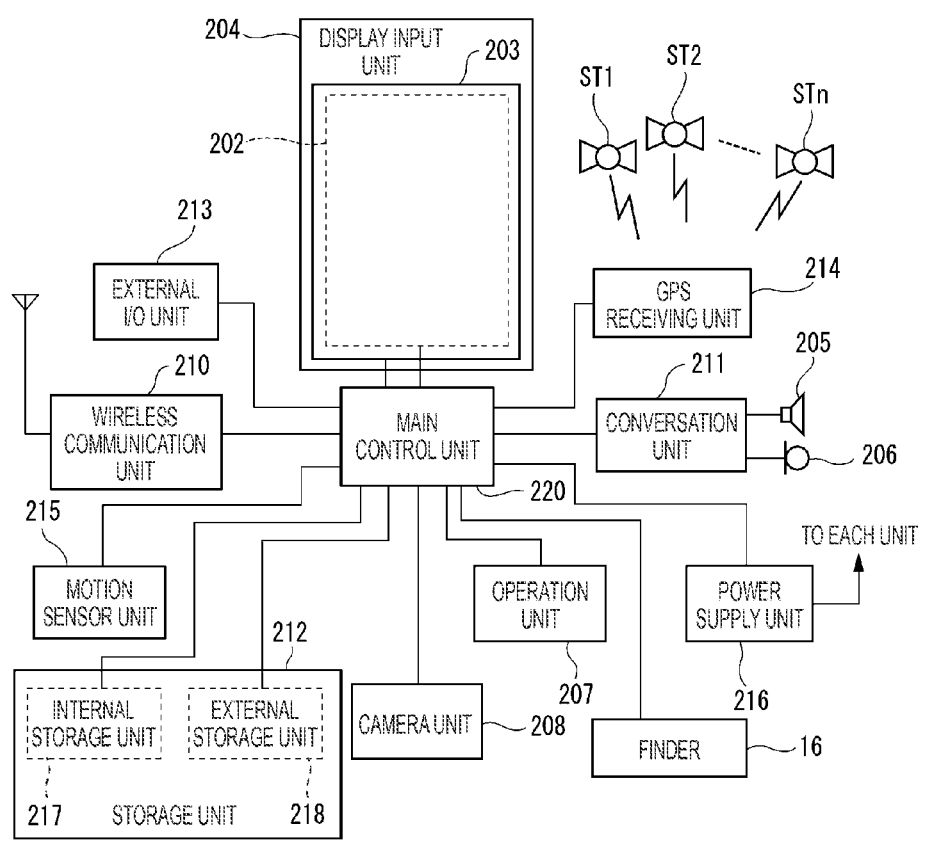
FIG. 21 is a functional block diagram of the smart phone of FIG. 20.

FIG. 21 is a block diagram illustrating the configuration of the smart phone 200 illustrated in FIG. 20. As illustrated in FIG. 21, main elements of the smart phone include a wireless communication unit 210, the display input unit 204, a conversation unit 211, the operation unit 207, the camera unit 208, a storage unit 212, an external I/O unit 213, a GPS (Global Positioning System) receiving unit 214, a motion sensor unit 215, a power supply unit 216, a main control unit 220, and the finder device 16. The smart phone 200 has, as a main function, a wireless communication function in which a mobile radio communication is performed through a base station device BS (not illustrated) and a mobile communication network NW (not illustrated).

The wireless communication unit 210 performs a radio communication in relation to the base station device BS accommodated in the mobile communication network NW under the instruction of the main control unit 220. By using the radio communication, reception and transmission of various file data such as audio data or image data, and e-mail data, and reception of web data or streaming data are performed.

The display input unit 204 is a so-called touch panel which displays, for example, an image (a still image or a moving image) or text information to visually provide information to a user, and detects the user's operation on the displayed information under the control of the main control unit 220. The display input unit 204 includes the display panel 202 and the operation panel 203.

The display panel 202 uses, for example, a liquid crystal display (LCD), or an organic electro-luminescence display (OELD) as a display device. The operation panel 203 is a device which is mounted so that an image displayed on a display surface of the display panel 202 is recognizable, and configured to detect one or more coordinates operated by a finger of a user or a stylus. When the device is operated by the finger of the user or the stylus, a detection signal generated due to the operation is output to the main control unit 220. Then, the main control unit 220 detects an operation location (a coordinate) on the display panel 202 based on the received detection signal.

As illustrated in FIG. 20, in the smart phone 200 as an exemplary imaging apparatus of the present invention, the display panel 202 and the operation panel 203 are integrated to constitute the display input unit 204, in which the operation panel 203 is disposed to completely cover the display panel 202. When such a disposition is employed, the operation panel 203 may serve to detect the user's operation even in a region outside the display panel 202. That is, the operation panel 203 may have one region for detecting a portion overlapping the display panel 202 (hereinafter, referred to as a display region), and the other region for detecting a periphery portion not overlapping the display panel 202 (hereinafter, referred to as a non-display region).

Meanwhile, the size of the display region and the size of the display panel 202 may completely match each other, but do not have to necessarily match each other. The operation panel 203 may have two sensing regions including an outer region and an inner region. The width of the outer region is properly designed according to, for example, the size of the case 201. As a location detecting method, for example, a matrix switch method, a resistance film method, a surface acoustic wave method, an infrared method, an electromagnetic induction method, or an electrostatic capacitance method may be employed in the operation panel 203, or other methods may be employed.

The conversation unit 211 includes the speaker 205 or the microphone 206. The conversation unit 211 converts a user voice input through the microphone 206 into audio data processible in the main control unit 220 and outputs the audio data to the main control unit 220, or decodes the audio data received by the wireless communication unit 210 or the external I/O unit 213, and outputs the decoded audio data from the speaker 205. As illustrated in FIG. 20, for example, the speaker 205 may be mounted at the same plane as the surface where the display input unit 204 is provided, and the microphone 206 may be mounted at the side surface of the case 201.

The operation unit 207 is a hardware key using, for example, a key switch, and receives an instruction from a user. For example, as illustrated in FIG. 20, the operation unit 207 is a push button-type switch mounted on the side surface of the case 201 of the smart phone 200, which is turned on by being pressed by, for example, a finger, and is turned off by a restoring force of, for example, a spring when the finger is released.

The storage unit 212 stores a control program or control data of the main control unit 220, application software, address data corresponding to a name or a phone number of a communication partner, data of sent and received e-mails, web data downloaded through web browsing, or downloaded contents data, and temporarily stores, for example, streaming data. The storage unit 212 is constituted by an internal storage unit 217 embedded within a smart phone, and an external storage unit 218 having a detachable external memory slot. Each of the internal storage unit 217 and the external storage unit 218 which constitute the storage unit 212 is implemented using a storage medium such as, a flash memory type memory, a hard disk type memory, a multimedia card micro type memory, a card type memory (e.g., a micro SD (registered trademark) memory), a RAM (Random Access Memory), and a ROM (Read Only Memory).

The external I/O unit 213 serves as an interface with all external devices connected to the smart phone 200, and is configured to directly or indirectly connect to other external devices through, for example, a communication (e.g., universal serial bus (USB), or IEEE1394) or a network (e.g., internet, wireless LAN, Bluetooth (registered trademark), Radio Frequency Identification (RFID), Infrared Data Association (IrDA) (registered trademark), Ultra Wide Band (UWB) (registered trademark), ZigBee (registered trademark)).

Examples of the external devices connected to the smart phone 200 may include a wired/wireless headset, a wired/wireless external charger, a wired/wireless data port, a memory card or a SIM (Subscriber Identity Module)/UIM (User Identity Module) card connected through a card socket, an external audio/video device connected through an audio/video I/O (Input/Output) terminal, a wirelessly connected external audio/video device, a wired/wirelessly connected smart phone, a wired/wirelessly connected PC, a wired/wirelessly connected PDA, and an earphone. The external I/O unit 213 may allow data transmitted from these external devices to be transmitted to each component within the smart phone 200, or data within the smart phone 200 to be transmitted to the external devices.

The GPS receiving unit 214, under an instruction of the main control unit 220, receives GPS signals transmitted from GPS satellites ST1 to STn, and executes a positioning calculation process based on the plurality of received GPS signals to detect a location of the smart phone 200 which is constituted by a latitude, a longitude, and an altitude. The GPS receiving unit 214 may detect a location using location information when the location information can be acquired from the wireless communication unit 210 or the external I/O unit 213 (e.g., a wireless LAN).

The motion sensor unit 215 includes, for example, a three-axis acceleration sensor, and detects a physical movement of the smart phone 200 under an instruction of the main control unit 220. When the physical movement of the smart phone 200 is detected, a direction or an acceleration of movement of the smart phone 200 is detected. This detection result is output to the main control unit 220.

The power supply unit 216, under an instruction of the main control unit 220, supplies power accumulated in a battery (not illustrated) to each unit of the smart phone 200.

The main control unit 220 includes a microprocessor and operates according to a control program or control data stored in the storage unit 212 to generally control respective units of the smart phone 200. The main control unit 220 has a mobile communication control function for controlling respective units of a communication system in order to perform voice communication or data communication through the wireless communication unit 210, and an application processing function.

The application processing function is implemented when the main control unit 220 is operated according to application software stored in the storage unit 212. Examples of the application processing function may include an infrared communication function for performing data communication with the opposing device by controlling the external I/O unit 213, an e-mail function for transmitting and receiving e-mails, and a web browsing function for reading web pages.

The main control unit 220 also includes an image processing function such as displaying of a video on the display input unit 204, based on image data (data of a still image or a moving image) of, for example, received data or downloaded streaming data. The image processing function refers to a function performed by the main control unit 220 in which the image data are decoded, and the decoded data are subjected to an image processing to display an image on the display input unit 204.

Further, the main control unit 220 executes a display control on the display panel 202, and an operation detection control for detecting a user operation through the operation unit 207 and the operation panel 203. When the display control is executed, the main control unit 220 displays an icon for starting application software, or a software key such as, for example, a scroll bar, or displays a window on which an e-mail is to be written. The scroll bar refers to a software key configured to receive an instruction for moving a display portion of an image in a case, for example, a large image which cannot be included in the display region of the display panel 202.

When the operation detection control is executed, the main control unit 220 detects the user's operation through the operation unit 207, receives an operation on the icon, or input of a character string into an input section of the window through the operation panel 203, or receives a scrolling requirement of a displayed image through the scroll bar.

Also, the main control unit 220 has a touch panel control function so that when the operation detection control is executed, the main control unit 220 determines whether an operation location on the operation panel 203 is a portion overlapping the display panel 202 (a display region), or a periphery portion not overlapping the display panel 202 (a non-display region), and controls sensing regions of the operation panel 203 or a display location of the software key.

The main control unit 220 may detect a gesture operation on the operation panel 203, and execute a predetermined function according to the detected gesture operation. The gesture operation does not refer to a conventional simple touch operation, but to an operation of drawing a trail by, for example, a finger, simultaneously specifying a plurality of locations, or drawing a trail for at least one from a plurality of locations by combining these two operations.

The camera unit 208 is a digital camera which electronically photographs an image by using an imaging device such as a CMOS (Complementary Metal Oxide Semiconductor) or a CCD (Charge-Coupled Device). The camera unit 208, under the control of the main control unit 220, may convert image data obtained by photographing into image data compressed in, for example, JPEG (Joint Photographic coding Experts Group) so as to store the compressed image data in the storage unit 212, or output the compressed image data through the external I/O unit 213 or the wireless communication unit 210. In the smart phone 200 illustrated in FIG. 20, the camera unit 208 is mounted in the same plane as the surface where the display input unit 204 is provided, but the location where the camera unit 208 is mounted is not limited thereto. The camera unit 208 may be mounted on the rear surface of the display input unit 204. Also, a plurality of camera units 208 may be mounted. When the plurality of camera units 208 are mounted, a camera unit 208 provided for photography may be switched to solely take a photograph, or the plurality of camera units 208 may be simultaneously used for photography.

The camera unit 208 may be used for various functions of the smart phone 200. For example, the image obtained by the camera unit 208 may be displayed on the display panel 202, or the image of the camera unit 208 may be used as one operation input for the operation panel 203. When the GPS receiving unit 214 detects a location, the location may be detected by referring to the image from the camera unit 208. Further, while referring to the image from the camera unit 208, determination on the optical axis direction of the camera unit 208 of the smart phone 200, or determination on a current usage environment may be performed without using the three-axis acceleration sensor, or in conjunction with the three-axis acceleration sensor. Of course, the image from the camera unit 208 may be used within the application software.

Further, the image data of the still image or the moving image may be added with, for example, location information acquired by the GPS receiving unit 214, audio information acquired by the microphone 206 (which may be converted into text information through voice-to-text conversion by, for example, the main control unit), or posture information acquired by the motion sensor unit 215 and then stored in the storage unit 212, or output through the external I/O unit 213 or the wireless communication unit 210.

Since the finder device 16 provided in the thin smart phone 200 as described above is quite small, the imaging device 41 to be provided within the finder device 16 is also quite small. However, the same as in the exemplary embodiments as described in FIGS. 1 to 19 may be realized.

In the exemplary embodiment of FIG. 20, the camera unit 208 may not be provided, but the imaging device within the finder device 16 may also serve as the camera unit 208. Even in the exemplary embodiments of FIGS. 2 and 6, the photographing lens 12 or the imaging device 22 may be omitted, while the imaging device 36 or 41 within the finder device 16 may be used for performing an actual photography.

In a case of a highly functional information device such as a smart phone, an application software may successively contact the object DB 45 to find out a current location. Accordingly, for example, a user of an imaging apparatus of FIG. 1 or 20 who wants to know a current location of a smart phone of an acquaintance, that is, a place the acquaintance is present, may easily find out the current location by looking in the finder device 16 when the smart phone of the acquaintance is selected as a search object.

As described above, the exemplary embodiments disclose an image display device including: a beam splitter that splits an incident light entering from a subject side; an imaging device that converts a first optical image generated by an one-side incident light split by the beam splitter into an electrical signal and outputs the converted electrical signal as a capture image; a synthesis image generating unit that generates an electronic information image aligned with a main subject image in the capture image; a display panel that displays the electronic information image; and an optical prism that emits an optical image of the electronic information image projected from the display panel to be superimposed on a second optical image generated by the other-side split incident light.

The image display device of the exemplary embodiments may further include a detecting unit that detects from the capture image, a subject corresponding to an object selected by a user, in which the electronic information image is an image which indicates the object is present in the second optical image.

The image display device of the exemplary embodiments may further include: a first sensor that detects location information of a present site; a second sensor that detects a direction where the incident light enters; and a third sensor that detects a posture of the image display device, in which the detecting unit detects a presence of the object based on respective signals detected by the first to third sensors.

The image display device of the exemplary embodiments may have a configuration in which the object is registered in an object database, and includes at least one of geographical information and information indicating a current location of an information device.

The image display device of the exemplary embodiments may have a configuration in which the electronic information image is a virtual object CG image according to a disposing position of a main subject in the capture image, and is an image in which a region hidden by the main subject in a depth direction to be invisible is excluded.

The image display device of the exemplary embodiments may further include: a first sensor that detects location information of a present site; a second sensor that detects a direction where the incident light enters; and a third sensor that detects a posture of the image display device, in which the synthesis image generating unit determines a display position of the virtual object CG image by respective signals detected by the first to third sensors.

The exemplary embodiments disclose an imaging apparatus being mounted with the image display device, as a finder device.

The exemplary embodiments disclose an image display method including: splitting an incident light entering from a subject side by a beam splitter; converting a first optical image generated by an one-side incident light split by the beam splitter into an electrical signal and outputting the converted electrical signal as a capture image by an imaging device; generating an electronic information image aligned with a main subject image in the capture image by a synthesis image generating unit; displaying the electronic information image on a display panel; and emitting an optical image of the electronic information image projected from the display panel to be superimposed on a second optical image generated by the other-side split incident light by an optical prism.

In the above described exemplary embodiments, a user may observe a clear optical image of a subject without a time lag by looking in an image display device such as a finder device. Further, an electronic information image which is highly precisely aligned with the optical image may be additionally seen within the field of view, which improves use convenience or usefulness of the image display device.

The image display device according to the present invention may display highly precisely aligned electronic information to be superimposed on the optical image of the subject seen by an eye. Thus, it is possible to provide an image display device excellent in user usability or usefulness. The image display device may be usefully used as a finder device for, for example, a digital camera.

The present application is based on Japanese Patent Application (No. 2012-60381) filed on Mar. 16, 2012, the contents of which are incorporated herein.

What is claimed is:

1. An image display device, comprising:
    a beam splitter that splits an incident light entering from a subject side;
    an imaging device that converts a first optical image generated by an one-side incident light split by the beam splitter into an electrical signal and outputs the converted electrical signal as a capture image;
    a synthesis image generating unit that generates an electronic information image which includes a partial image obtained from a main subject in the capture image and a masked image where other region relative to the partial image is displayed in black, where a position of the partical image in the electronic information image is the same as a position of an image of the main subject in the capture image;
    a display panel that displays the electronic information image; and
    an optical prism that emits an optical image of the electronic information image projected from the display panel to be superimposed on a second optical image generated by the other-side split incident light.

2. The image display device of claim 1, further comprising a detecting unit that detects from the capture image, a subject corresponding to an object selected by a user,
    wherein the electronic information image is an image which indicates the object is present in the second optical image.

3. The image display device of claim 2, further comprising:
    a first sensor that detects location information of a present site;
    a second sensor that detects a direction where the incident light enters; and
    a third sensor that detects a posture of the image display device,
    wherein the detecting unit detects a presence of the object based on respective signals detected by the first to third sensors.

4. The image display device of claim 2, wherein the object is registered in an object database, and includes at least one of geographical information and information indicating a current location of an information device.

5. An imaging apparatus mounted with the image display device of claim 1, as a finder device.

6. An image display method, comprising:
    splitting an incident light entering from a subject side by a beam splitter;
    converting a first optical image generated by an one-side incident light split by the beam splitter into an electrical signal and outputting the converted electrical signal as a capture image by an imaging device;
    generating by a synthesis image generating unit, an electronic information image which includes a partial image obtained from a main subject in the capture image and a masked image where other region relative to the partial image is displayed in black, where a position of the partical image in the electronic information image is the same as a position of an image of the main subject in the capture image;
    displaying the electronic information image on a display panel; and
    emitting an optical image of the electronic information image projected from the display panel to be superimposed on a second optical image generated by the other-side split incident light by an optical prism.

* * * * *